Oct. 25, 1955   P. A. HOLMES   2,721,415
LATCH BAR
Filed May 18, 1951
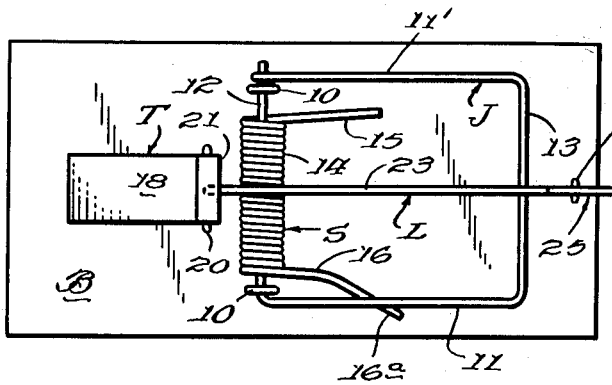
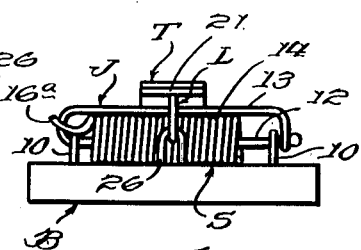
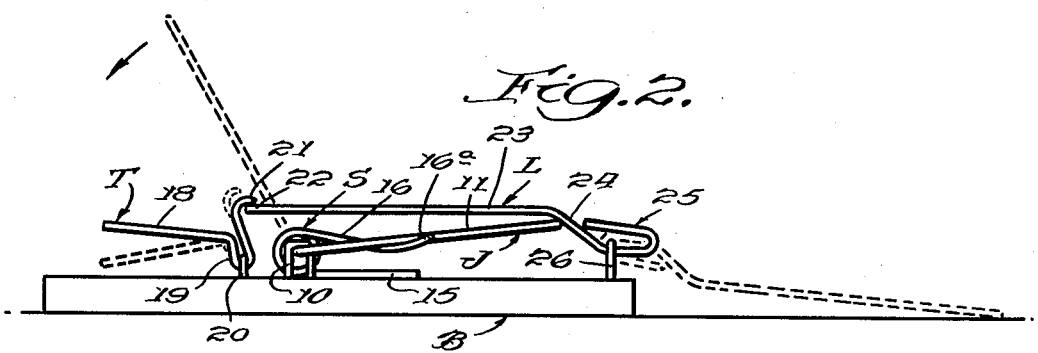
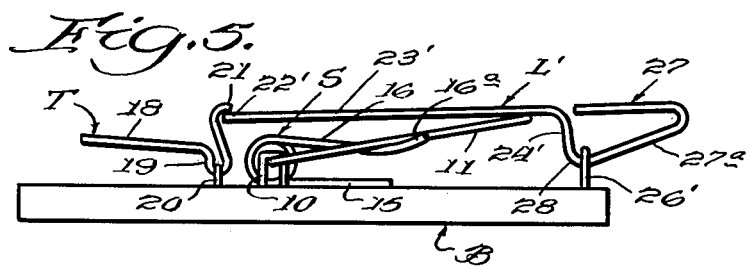
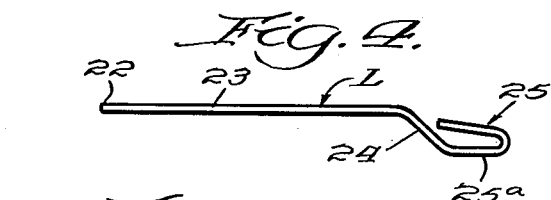
Inventor:
Paul A. Holmes.
By
Fulwider, Mattingly & Babcock.
Att'ys.

United States Patent Office 2,721,415
Patented Oct. 25, 1955

2,721,415

LATCH BAR

Paul A. Holmes, Long Beach, Calif.

Application May 18, 1951, Serial No. 226,970

5 Claims. (Cl. 43—81)

The present invention relates to the field of traps, snares, and the like, and more particularly to a novel latch bar construction for rodent traps.

Although numerous rodent traps and snares have been devised and marketed in the past, the majority of these devices have been found difficult to "set" by those inexperienced in their use. It is necessary that the trigger utilized with apparatus of this nature be sufficiently sensitive as to actuate the spring-loaded mechanisms thereof at the time the rodent contacts the bait. Due to this trigger sensitivity, the trap is often sprung inadvertently during the baiting thereof whereby the hands or fingers of the person handling the device are painfully caught by the spring-loaded jaw of the trap.

The primary purpose in devising my present invention is to provide a rodent trap adapted to be easily baited and used by a person inexperienced in handling such devices without risk of personal harm.

A major object of my invention is to provide a rodent trap of extremely simple mechanical structure that may be fabricated from standard commercially available materials, and due to the latch bar construction thereof, may be easily baited and set by one inexperienced in the handling of such devices without risk of being harmed thereby.

Another object of my invention is to supply an animal trap embodying an elongate latch bar with a cooperating loop of special configuration forming a part thereof, which bar is adapted to be readily maneuvered to engage the trigger mechanism of the trap to guide the bar into a holding position when it is subjected to the force of the spring-loaded jaw of the trap.

Yet another object of my invention is to furnish a trap which provides the above outlined advantages over prior devices, and due to its simplified construction may be retailed at a sufficiently low price as to encourage its widespread use.

These and other objects and advantages of my invention will become apparent from the following description of a preferred form thereof, and from the drawing illustrating that form in which:

Figure 1 is a plan view of my rodent trap;

Figure 2 is a side elevational view of the device;

Figure 3 is an end elevational view of the invention;

Figure 4 is a side elevation of the latch bar shown in Figure 2;

Figure 5 is a side elevational view of my trap showing an alternate form of latch bar utilized therewith; and, Figure 6 is a side elevational view of the latch bar used with my trap as shown in Figure 5.

Referring now to the drawings for the general arrangement of my invention, it will be seen that it includes a substantially rectangular base B on which a rodent-engaging jaw J is pivotally supported. The jaw J is actuated from a set position by a spring S. Jaw J is maintained in a spring-actuated position by a latch bar L extending thereacross, which bar engages a trigger mechanism T on one extremity thereof. Trigger mechanism T is adapted to support bait of a nature attractive to rodents, with said trigger being sufficiently sensitive that it will disengage latch bar L when a rodent seeks to remove the bait positioned on the trigger mechanism.

Base B, as may best be seen in Figures 1 to 3 inclusive, may be formed from any rigid sheet material that is adapted to have two intermediately positioned, laterally spaced staples 10 affixed thereto.

Jaw J is preferably fabricated from a stiff wire, bent or otherwise formed to assume a rectangular configuration as shown in Figure 1. When so formed, the jaw comprises two side pieces 11 and 11' connected by two end pieces 12 and 13. End piece 12 extends through staples 10 and is pivotally supported therein, as seen in Figure 2. End piece 13 serves to forcibly engage the head portion of the rodent when entrapped between it and the outer portion of base B when the trigger mechanism T is actuated by the rodent.

Jaw J is caused to forcefully pivot from the set position shown in Figure 2 in a counterclockwise direction by the spring S. Spring S is preferably formed from a resilient metallic wire in an elongate helical shape 14 (Figure 1), one end portion of which terminates in a straight leg 15. The wire forming spring S is so wound that when the jaw J is properly set (Figure 2), the spring is under tension, whereby the leg 15 is forcefully urged downwardly to contact the upper surface of base B. An oppositely disposed leg 16 of spring S is provided with an angularly disposed portion 16a which extends under side piece 11 of jaw J. When the trap is set, leg 16 at all times tends to forcefully urge jaw J into an animal-engaging position, but is restrained by latch bar L when disposed as shown in solid line in Figure 2.

The trigger mechanism T (Figures 1 and 2) includes an elongate rectangular platform 18 on which bait may be positioned. The forwardly disposed end portion of platform 18 terminates in a downwardly extending loop 19 which pivotally engages a staple 20 or other inverted U-shaped member affixed to the upper surface of base B. The outwardly disposed portion of loop 19 extends upwardly to terminate in a short forwardly disposed catch or lip 21. The latch bar L comprises an elongate portion 23, the inwardly disposed extremity 22 of which removably engages catch 21. The outer end of elongate portion 23 develops into a downwardly depending arm 24 forming a part of elongate loop 25.

Loop 25 has a straight wire portion 25a that slidably engages a staple 26 mounted on one of the upper end portions of base B. In this form of my latch bar L, it is preferable that the arm 24 extend downwardly and outwardly. Due to its slope, arm 24 is of considerable assistance in setting the trap. As the latch bar L is maneuvered longitudinally by grasping the loop 25 to cause the bar extremity 22 to engage catch 21, the sloping arm 24 is in slidable contact with end piece 13 of jaw J. Should the end piece 13 be at too high an elevation for the latch bar extremity 22 to engage catch 21, the slope of the arm 24 will force end piece 13 downwardly as the latch bar is moved longitudinally inward until such engagement between the latch bar and catch is possible.

The operation of my invention is extremely simple. After the bait is positioned on platform 18, the animal-engaging jaw J is pivoted to the position shown in Figures 1 and 2. Jaw J may be held in a spring-actuating position by grasping the bottom surface of base B and the upper surface of one of the jaw side pieces 11 or 11' between a finger and thumb whereby loop 25 may be grasped by the other hand and the straight latch bar portion 23 maneuvered so that the end 22 thereof will engage catch 21. Due to the shape thereof, loop 25 permits longitudinal movement of bar portion 23 to the point where catch 21 will be engaged by bar L and the jaw J allowed to move slowly upwardly due to the action of spring S until the animal-engaging portion 13 of the jaw is situated under the latch bar arm 23, as seen in Figure 2. Manual pressure may then be gradually released until the spring-loaded jaw J exerts its full force on latch bar L, and the trap is fully set and ready for use.

When a rodent contacts platform 18 in an attempt to remove the bait positioned thereon, the platform will pivot downwardly from the position shown in solid line (Figure 2) to that shown in phantom line. As the platform moves in this manner, catch 21 also moves to become disengaged from the latch bar extremity 22 which permits jaw J to move in a counterclockwise direction and both engage and hold the animal that actuated the trigger mechanism T.

Although the latch bar L above described has been found to operate very satisfactorily, it will also be apparent that a modified form of latch bar L' may be utilized (see Figure 5). Latch bar L' includes a straight portion 23', the extremity 22' of which is adapted to removably engage catch 21' in the same manner as that of the previously described form of my invention. Latch bar L' terminates at the outwardly disposed end thereof in a downwardly and slightly outwardly extending arm 24' forming a generally triangularly shaped loop 27. Loop 27 has a straight portion 27a slidable within the confines of the staple 26'. Latch L is used in the same manner as previously described, but when latch bar L' is in a trigger-engaging position, the staple 26' engages the loop 27 at substantially an apex 28 formed between the adjoining ends of the arm 24' and the straight loop portion 27a. This latter form of latch bar L' may be found easier to use in setting the trap, for when the latch is in a trigger-engaged position it is in a predetermined location where the horizontal portion of staple 26 substantially abuts against the interior latch bar arm 24' and is disposed in apex 28. From experience it has been found that both bars L and L' provide an easily set rodent trap that will not injure the user thereof. It will be particularly noted that in both forms of my latch bar L and L', the loops 25 and 27 respectively, permit the trap to be set without the necessity of manually contacting trigger T.

Although the form of rodent trap embodying my novel latch bar herein shown and described is fully capable of achieving the objects and providing the advantages hereinabove described, it is to be understood that it is merely illustrative of the presently preferred embodiments of my invention and that I do not mean to limit myself to the details of construction thereof other than as defined in the appended claims.

I claim:

1. A rodent trap that includes: a base; a spring-loaded jaw pivotally mounted in said base; a trigger movably mounted on said base, on which trigger bait may be disposed; an inverted U-shaped member affixed to said base; and a latch bar having an elongated angular loop formed on one end, said loop adapted to be grasped between the fingers and having an apex therein, said loop movably engaging said member for both longitudinal and pivotal adjustment of said bar whereby when said spring-loaded jaw is pivoted into its set position, said loop may be grasped to maneuver the free end of said bar over said jaw into engagement with said trigger in the off position, whereupon the spring-loading on said jaw urges said latch bar upwardly so raising said trigger into the on position as said apex seats itself in said U-shaped member, thereby maintaining said jaw in a spring-loaded set position from which it may move to a spring-loaded rodent engaging position when said trigger is tripped by a rodent.

2. A rodent trap that includes: a base; a spring-loaded jaw pivotally mounted on said base; a trigger pivotally supported on said base and having latch bar engaging means on one end thereof, said trigger including a platform on which bait may be disposed; an inverted U-shaped member affixed to said base; and a latch bar having an elongate loop formed on one end thereof, part of said loop forming a downwardly disposed apex, said loop movably engaging said member and adapted to be grasped between the fingers, whereby when said spring-loaded jaw has been pivoted into its set position, said loop may be grasped to maneuver the free end of said bar over said jaw into engagement with said trigger in the off position, whereupon the spring-loading on said jaw urges said latch bar upwardly so raising said trigger into the on position as said apex seats itself against said U-shaped member, thereby maintaining said jaw in a spring-loaded set position from which it may move to a spring-loaded rodent engaging position when said trigger is tripped by a rodent.

3. A rodent trap that includes: a base; a spring-loaded jaw pivotally mounted on said base; a trigger pivotally supported on said base and having latch bar engaging means on one end thereof, said trigger including a platform on which bait may be disposed; an inverted U-shaped member affixed to said base; and a latch bar having an elongate loop substantially in the form of a triangle formed on one end thereof, said loop slidably engaging said member and, after said jaw is pivoted into its set position, said loop when grasped serving to maneuver the free end of said bar over said jaw into engagement with said trigger for said bar to hold said trigger in the trigger-on position, said U-shaped member engaging the most downwardly portion of said triangularly shaped loop, and said trigger assuming its on position during said maneuvering without being manually touched.

4. A rodent trap having a base on which a spring-loaded jaw is pivotally supported, said base bearing a movable trigger on which bait may be disposed, said trap characterized by a latch bar extending over said jaw when said jaw is in the non-rodent engaging position and removably held in said position by said trigger, said bar having an elongate angular loop formed therein which loop slidably engages an inverted U-shaped member affixed to said base, said loop permitting said bar to be longitudinally maneuvered into a position to engage said trigger in its off position without said trigger being touched manually, and said trigger when so engaged cooperating with said bar to maintain said jaw in a non-rodent engaging position with said member engaging the apex of said loop until such time as said trigger is moved by a rodent to disengage said bar therefrom whereupon said jaw is forcibly pivoted by said spring-loading to a rodent engaging position.

5. A rodent trap as defined in claim 4 in which said latch bar includes an angular downwardly extending section that forms a part of said loop, which section slidably contacts said jaw to hold it in a non-engageable position.

References Cited in the file of this patent

UNITED STATES PATENTS

| | | |
|---|---|---|
| 528,671 | Hooker | Nov. 6, 1894 |
| 873,988 | Chasse | Dec. 17, 1907 |
| 2,498,169 | Mann | Feb. 21, 1950 |
| 2,532,916 | Houston | Dec. 5, 1950 |